Dec. 14, 1954  R. H. ANDRESEN  2,696,940
SEMIAUTOMATIC BOTTLE-CAPPING MACHINE
Filed April 28, 1950  4 Sheets-Sheet 1
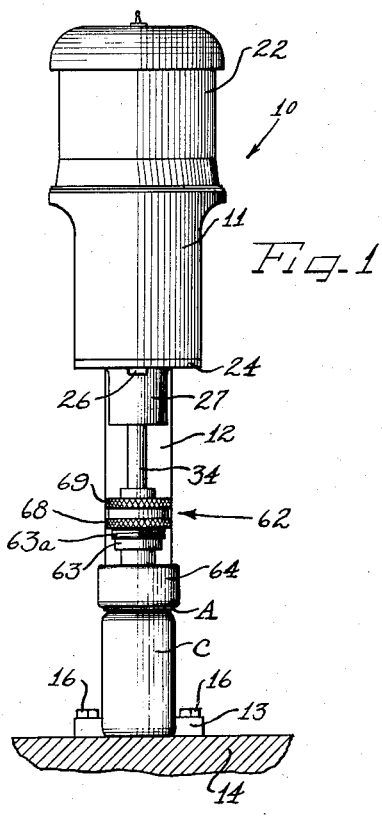
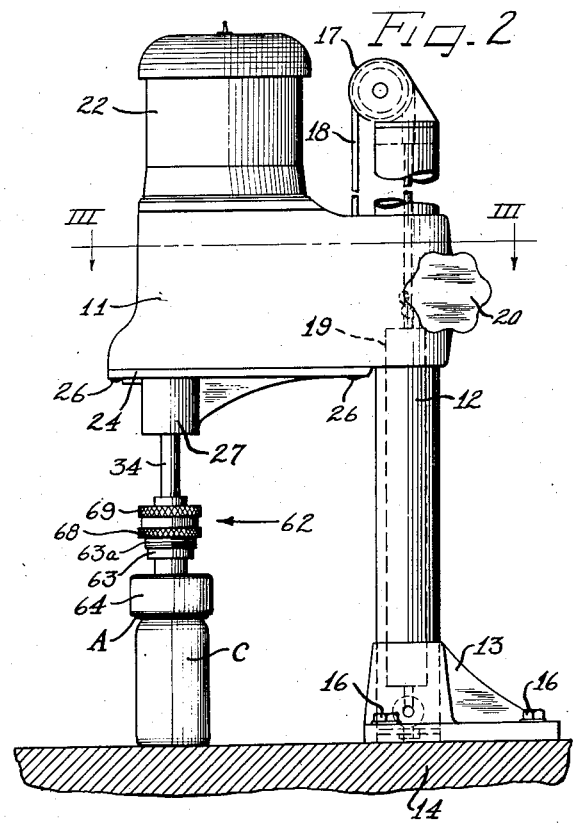
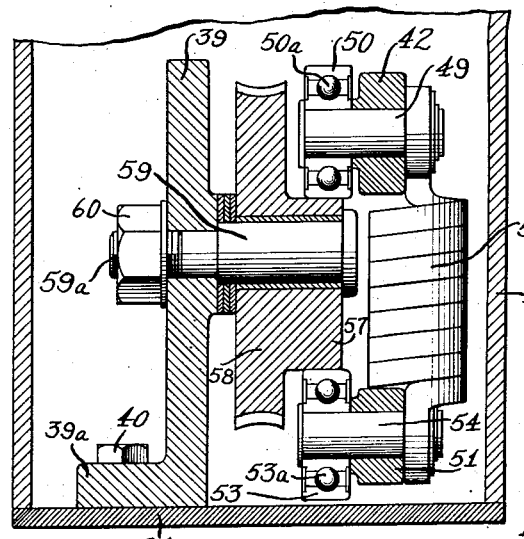
Inventor
Raymond H. Andresen

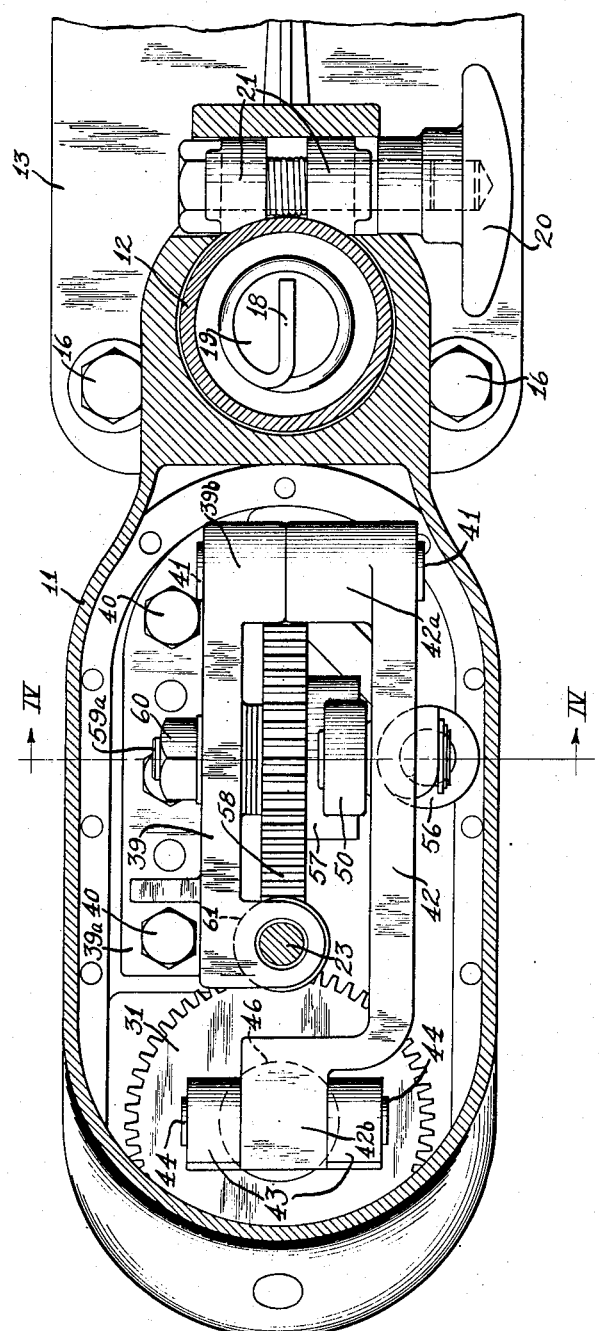

Dec. 14, 1954  R. H. ANDRESEN  2,696,940
SEMIAUTOMATIC BOTTLE-CAPPING MACHINE
Filed April 28, 1950  4 Sheets-Sheet 3

Inventor
Raymond H. Andresen
by The Firm of Charles H. Hill
Attys

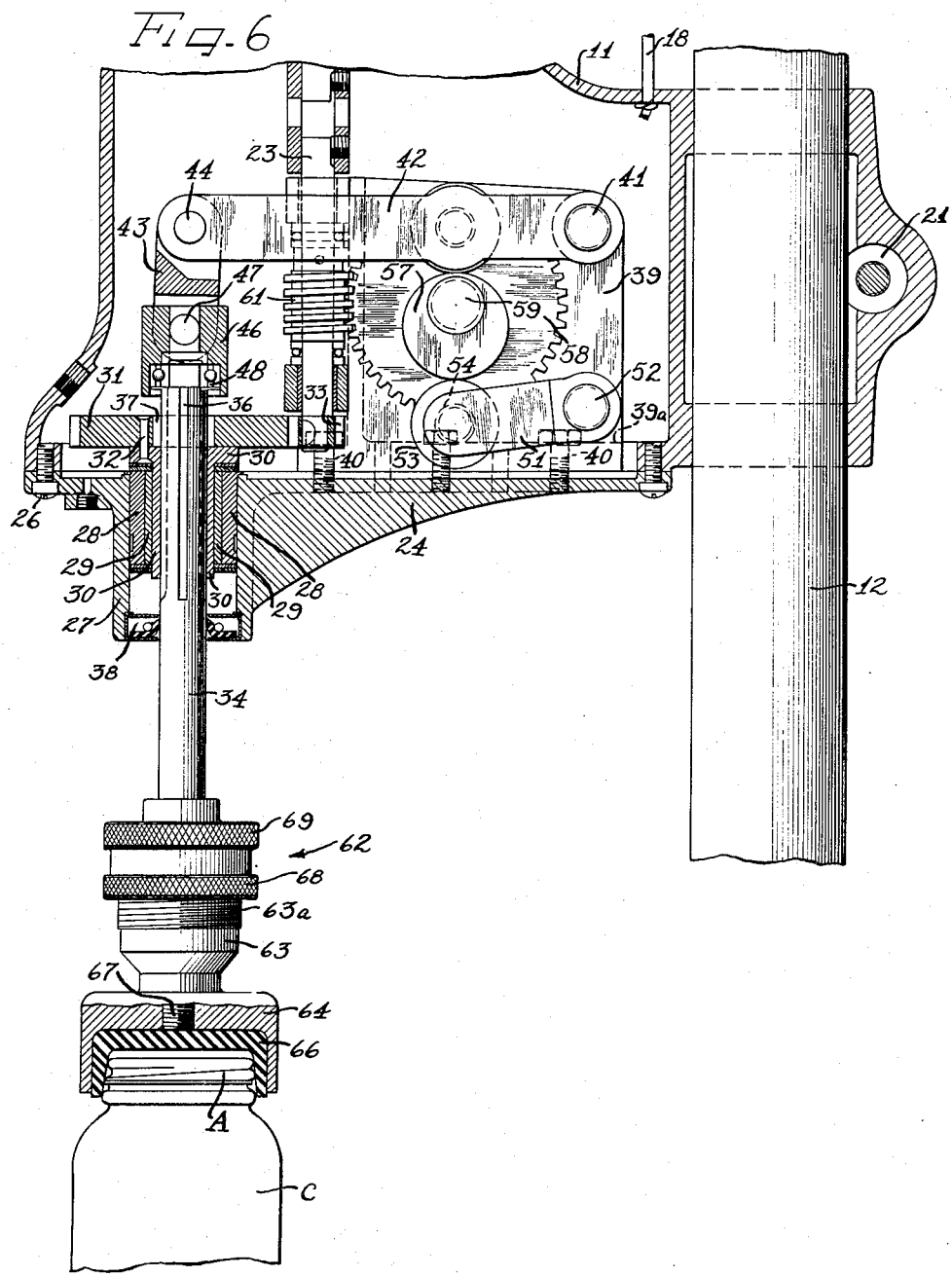

ly to a portable type bottle
2,696,940

SEMIAUTOMATIC BOTTLE-CAPPING MACHINE

Raymond H. Andresen, Chicago, Ill.

Application April 28, 1950, Serial No. 158,848

7 Claims. (Cl. 226—88)

This invention relates generally to a bottle capping mechanism and more particularly to a portable type bottle capping machine including a reciprocating mechanism to continuously reciprocate a screw cap applying spindle through a capping cycle with a minimum amount of operator manipulation and with a fixed and predetermined downward pressure. The machine of this invention further includes a novel adjustable torque clutch on one end of the screw cap applying spindle which permits a predetermined torque to be applied to a screw type container cap.

According to the general features of the present invention, a portable bottle capper is provided having frame elements mounted for vertically adjustable reciprocation on a suitable support structure and including a motor means with a drive shaft connected therewith to rotate and to reciprocate a reciprocable and rotatable spindle adapted to apply a screw cap to a container positioned relative thereto.

Spindle rotation is obtained by connecting the drive shaft to the spindle through a spur and pinion gear drive.

Vertical reciprocation of the spindle through a capping cycle is obtained through the provision of a lever arm arrangement, a first lever arm having one end pivotally and rotatably connected to the end of the spindle and the other end thereof pivotally connected to the frame. Roller means provided intermediate the ends of the lever arm are drivingly engaged by a cam formed integrally with a gear driven by a suitable worm on the drive shaft. A second lever arm pivotally connected to the frame has roller means thereon arranged in vertical alignment with the cam and the roller means on the first lever arm. A tension spring is connected between the first and second lever arms so that operation of the motor means will rotate the cam to continuously reciprocate the spindle through a capping cycle, the downward thrust imparted to the spindle not exceeding the biasing force exerted by the tension spring.

On the lower end of the spindle an adjustable torque clutch is provided which includes a pair of mating concentrically disposed clutching elements, the innermost element being secured firmly to the spindle and the outermost element arranged to be biased by a resilient spring engageable with an adjustable cap threaded on a clutch housing, whereby the driving force imparted to a capping shell connected to the clutch housing may be selectively varied by positioning the cap on the clutch housing.

It is an object of the present invention, therefore, to provide a portable bottle capping machine wherein a cap screw applying spindle may be continuously reciprocated and rotated through a capping cycle so as to minimize operator fatigue.

Another object of the present invention is to provide a portable bottle capping machine having a continuously operating reciprocable cap screw applying spindle by means of which a predetermined downward pressure may be applied to a screw cap to be placed upon a container.

Yet another object of the present invention is to provide a portable bottle capping machine which includes an adjustable torque clutch to apply a predetermined torque to a container cap when screwing the cap into a container closing relationship.

A further object of the present invention is to provide a portable bottle capping unit which does not require the operator to apply any pressure force or actuating movement to the unit other than placing the container and the cap under the reciprocating cap applying spindle of the unit.

Another object of the present invention is to provide a reciprocating mechanism for a bottle capping machine which includes resilient biasing elements to apply a predetermined downward pressure and to eliminate any risk of damage to the capping machine or the container being capped, as well as to preclude injury to the operator of the machine.

Yet another object of the present invention is to provide a portable bottle capping machine in which the application of excessive screw cap tightening load is effectively precluded.

Many other advantages, features and additional objects of the present invention will become manifest to those versed in the art upon making reference to the detailed description which follows and the accompanying sheets of drawings in which a preferred embodiment of a portable bottle capping machine constructed in accordance with the principles of my invention is shown.

On the drawings:

Figure 1 is a front elevational view of a portable bottle bottle capping machine constructed in accordance with the principles of the present invention;

Figure 2 is a side elevational partially broken view of the portable bottle capping mechanism shown in Figure 1;

Figure 3 is a cross-sectional view enlarged to show additional details of construction taken on line III—III of Figure 2 and with parts in elevation;

Figure 4 is a fragmentary cross-sectional view taken generally along the line IV—IV of Figure 3;

Figure 6 is a view similar to Figure 5 but showing the various elements of the mechanism repositioned as when moved into cap engaging relationship.

As shown on the drawings:

Figure 5:
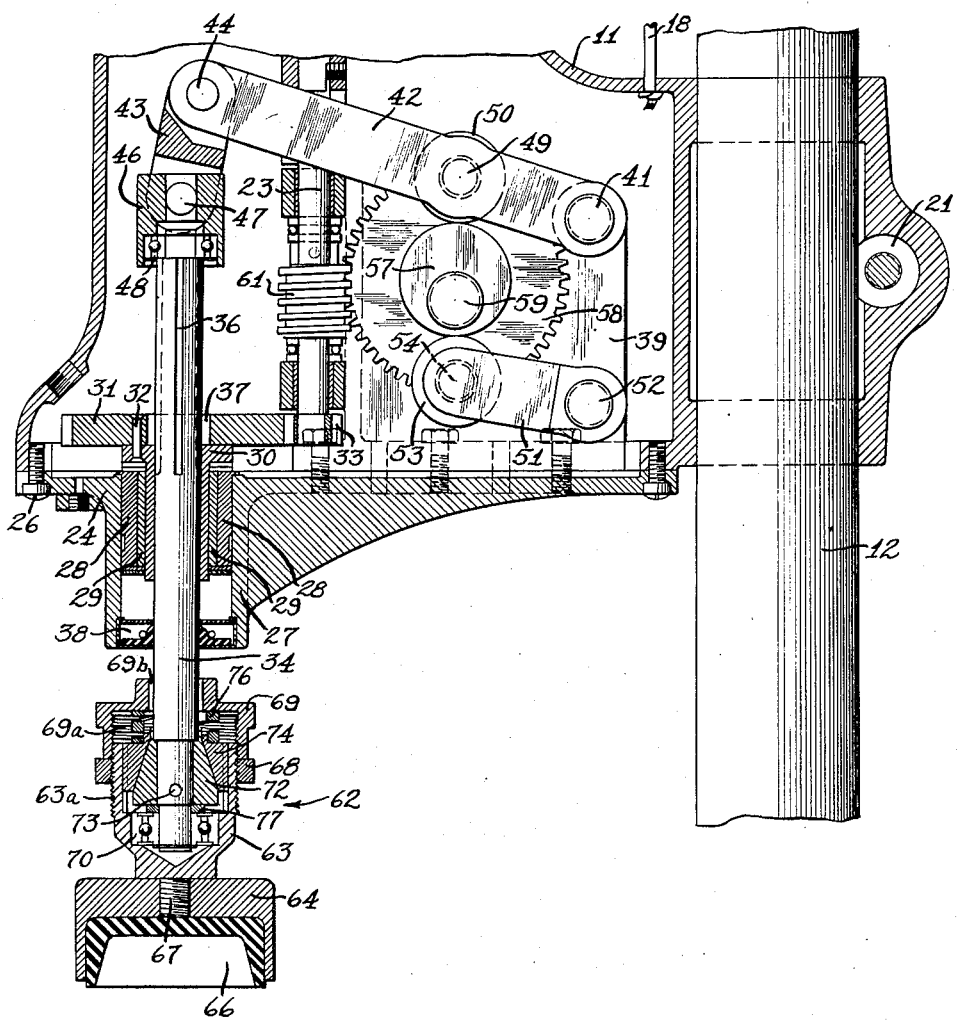
Figure 5 is a fragmentary cross-sectional view showing details of construction of the adjustable torque clutch and the reciprocating mechanism of the portable capping machine of this invention with parts removed for the sake of clarity.

The bottle capping mechanism of the present invention is indicated generally by the reference numeral 10 and includes a frame 11 mounted for vertically adjustable reciprocation on a support stanchion 12 positioned uprightly in a base 13 which may be firmly affixed to a table top 14 or other suitable supporting structure by means of a plurality of bolts 16. A pulley wheel 17 may be affixed to the top of the support stanchion 12 over which a belt 18 attached at one end to the frame 11 may be suspended, the other end of the belt 18 being attached to a suitable counterweight 19 reciprocable in the hollow bore defined by the support stanchion 12. The frame 11 may be locked in selectively adjusted vertical positions on the support stanchion 12 through the manipulation of a handle 20 (Figures 2 and 3) connected with a suitable locking cam structure 21 (Figures 3, 5 and 6) cooperable with the walls of the support stanchion 12.

The frame 11 preferably takes the form of a generally hollow casting upon which may be mounted a suitably encased motor means 22 which is firmly supported thereon and which has a drive shaft 23 extending therefrom into the hollow frame 11.

The bottom of the hollow frame 11 is closed by a cover 24 firmly assembled with the frame 11 by a plurality of screws 26, the cover defining a suitable hollow boss 27 to receive a bearing block 28 having a liner bearing 29 therein in which a journal bushing 30 may rotate.

The journal bushing 30 is firmly pinned to a spur gear 31 by means of pin means 32 and the spur gear 31 intermeshes with a pinion gear 33 situated on the end of the drive shaft 23.

A rotatable and reciprocable spindle 34 extends through the journal bushing 30 and is provided with a plurality of splined ribs 36 cooperable with complementary splined ribs defined in a centrally disposed aperture 37 defined by the spur gear 31 so that the spindle 34 may be reciprocated relative to the journal bushing 30 and the spur gear 31 but continuously rotated throughout the course of its traverse along a vertical axis.

A suitable shaft gland 38 is carried in the lowermost portion of the boss 27 through which the spindle 34 extends, the gland 38 forming a shaft seal between the frame cover 24 and the spindle 34.

To impart a reciprocatory motion to the rotatable spindle 34, a reciprocatory mechanism is provided including a bracket 39 firmly mounted within the frame 11 by a foot flange 39a through which pass a plurality of bolts 40, the bracket 39 having a boss portion 39b with a pivot pin 41 extending therethrough and upon which a boss portion 42a of a lever arm 42 may be rotatably mounted.

The other end of the lever arm 42 is provided with a boss portion 42b insertable between the arms of a yoke-like link member 43 and pivotally related thereto by a pivot pin 44. The link 43 in turn, is pivotally connected to a bearing retainer 46 by a pivot pin 47, the bearing retainer 46 housing a suitable roller bearing 48 and in which the spindle 34 may be rotatably carried. Intermediate the ends of the lever arm 42 is situated a pin 49 upon which is mounted a roller 50 having bearing elements 50a.

A second lever arm 51 having one end thereof pivotally connected to the bracket 39 by a pivot pin 52 has a roller 53 carried on the other end thereof by means of a pin 54, the roller 53 also having bearing elements 53a to promote good rotation of the roller 53. The rollers 50 and 53 on the lever arms 42 and 51, respectively, are aligned with respect to one another on a generally vertical axis passing through the pins 49 and 54.

A biasing means such as a tensioning element taking the form in this embodiment of a coil spring 56 (Figures 3 and 4) is connected to the protruding ends of the pins 49 and 54 so as to normally bias the lever arms 42 and 51 toward one another. The rollers 50 and 53 will therefore be biased into engaging contact with a cam 57 formed as an integral part of a gear 58 supported for rotation on a stub axle 59 firmly secured in the bracket 39 by a nut 60 threaded onto the end of a stud portion 59a formed on the end of the axle 59. The gear 58 is driven by a suitable worm 61 carried by the drive shaft 23.

The cam 57 is, of course, eccentrically disposed relative to the axis of the axle 59 and engagingly drives the rollers 50 and 53 so as to oscillate the lever arms 42 and 51 about their respective pivot points determined by the pivot pins 41 and 52.

It will be apparent that the cam 57 and the lever arm 51 actually operate as a cam and driver means between the gear 58 and the lever arm 42, however, it will be appreciated that the downward pressure applied by the lever arm 42 to the spindle 34 through the link 43 and the bearing housing 46 will be determined by the amount of bias exerted by the spring 56 connecting the lever arm 51 to the lever arm 42. The fixed value of resilience of the spring 56, which may be selected in accordance with a predetermined biasing force, eliminates the danger of damaging the machine or a container in the event that a careless operational sequence occurs.

Because of the fact that the motor means 22 may operate constantly to continuously rotate the gear 58, the cam and driver means of the reciprocating mechanism will reciprocate the spindle 34 continuously through a capping cycle, thereby minimizing the susceptibility of the operator to working fatigue since the operator need not apply any pressure force nor impart any actuating movement to the capping mechanism 10 other than placing the container and the cap under the spindle 34.

In order to impart a predetermined torque to a container cap being turned upon a container structure, an adjustable torque clutch indicated generally by the reference numeral 62 is provided on the lower portion of the spindle 34.

A clutch housing 63 is provided to which any suitable capping shell 64 having a resilient pad 66 inserted therein may be firmly assembled to the clutch housing 63, a threaded stud 7 engageable with the capping shell 64 being provided for that purpose.

The clutch housing 63 is provided with an externally threaded sleeve portion 63a to receive in threaded assembly thereon a locking nut 68 and a cap 69, the cap 69 taking the form of a cup-shaped element with an internally threaded bore as at 69a and having an aperture 69b formed in the end portion thereof through which the spindle 34 may freely pass.

The clutch housing 63 is generally hollow so that the spindle 34 may extend thereinto. Seated within the clutch housing 63 is a bearing element 70 which receives the end of the spindle 34 for rotative assembly relative to the clutch housing 63. A washer 77 surrounds the end of the spindle 34 and lies adjacent the bearing element 70 to abut a cone-shaped friction member 72 made out of a fiber-like material or other material having favorable friction and wear resistant characteristics and firmly connected to the spindle 34 by a dowel pin 73.

A bearing ring 74 made of a suitable material such as hardened steel or the like has an internal bore formed complementary to the cone-like configuration of the member 72, is confined by the clutch housing 63 and is disposed in generally encircling relationship to the friction member 72.

A resilient member 76 in this embodiment taking the form of a coil spring 76 surrounds the spindle 34 and is situated between the cap 69 and the bearing ring 74 to urge the bearing ring 74 into contact engagement with the cone-like friction member 72.

It will be apparent that the twisting torque delivered to the capping shell 64 by the clutch housing 63 will be dependent upon the frictional driving force between the complementary engaging surfaces of the bearing ring 74 and the cone-like friction member 72 which, in turn, is dependent upon the thrust delivered to the bearing ring 74 by the resilient member 76. As soon as the resisting force encountered by the capping shell 64 is equal to or greater than the twisting force, slippage will occur between the cone-like friction member 72 and the bearing ring 74. Therefore, in order to selectively adjust the twisting torque, the cap 69 may be selectively positioned axially along the length of the clutch housing 63 by loosening the locking nut 68 and threading the cap 69 against the bias of the resilient member 76.

In operation, the motor means 22 is energized so as to drive the shaft 23 which, in turn, will rotate the gear 31 through the pinion 33 and thereby rotate the spindle 34.

The reciprocating mechanism will be driven off of the shaft 23 by the worm 61 meshing with the gear 58 to rotate the cam 57, thereby oscillating the lever arms 42 and 51 about their pivot pins 41 and 52, respectively.

The spindle 34 will be reciprocated by the lever arm 42 with a downward thrust not exceeding the bias of the resilient connection afforded by the spring 56.

The operator is not required to apply any pressure force or impart any actuating movement to the capping mechanism 10 but need only place a container indicated by the reference character C on the table 14 directly under the spindle 34 so that a screw cap indicated by the reference character A may be engaged by the capping shell 64 on the end of the spindle 34. The possibilty of over-tightening the screw cap A being applied to the container C is precluded by the provision of the adjustable torque clutch 62, the cap 69, of which being adjustably positioned on the clutch housing 63 and locked thereon by the locking nut 68 so that the spring 76 causes a predetermined twisting torque to be delivered by the spindle 34 through the cone-like friction member 72 to the bearing ring 74.

Although various minor modifications may be made to the preferred structural embodiment herein described in considerable detail for the sake of clarity, it should be understood that I do not wish to be limited to the precise details herein described but wish to embody within the scope of this patent all such modifications as reasonably and properly come within the scope of my contribution to the art.

I claim as my invention:

1. A bottle capping mechanism comprising in combination, a support, a frame mounted for vertically adjustable reciprocation thereon, a motor means carried by the frame, a drive shaft connected therewith and having a worm thereon, a worm gear intermeshing with said worm, a cam formed integrally with and extending outwardly from said worm gear, a rotatable spindle vertically reciprocable in a portion of said frame, a pair of arms pivotally connected to said frame, each of said arms having mounted thereon roller means, said roller means arranged in diametrically opposed engaging disposition with said cam and lying generally on a vertical axis extending through both of said roller means and the center of the cam, the topmost arm having a pivotal and rotatable connection with said spindle, driving means between said shaft and said spindle to rotate said spindle, tensioning means between said pair of arms, and a capping shell on the end of the spindle to drivingly engage a bottle cap, whereby operation of said motor means will rotate said cam to continuously reciprocate said spindle, the downward thrust imparted to said spindle not exceeding the biasing force exerted by said tensioning means.

2. In a bottle capping machine, a frame, a rotatable spindle adapted to drivingly engage the cap of a bottle placed in engageable position therewith, said spindle being mounted for vertical reciprocation on said frame, a lever arm having one end pivotally and rotatably connected to one end of the spindle and the other end of the lever arm pivotally connected to said frame, roller means on said lever arm between the ends thereof, a second lever arm pivotally connected to said frame, roller means on said second lever arm and in vertical alignment with respect to said roller means on the other lever arm, a cam engagingly disposed between said roller means, a resilient element between and operably engaging both of the lever arms and means continuously rotating such cam and said spindle, whereby the lever arms will be oscillated and the spindle will be continuously reciprocated, the downward thrust imparted to the spindle not exceeding the biasing force exerted by the resilient element.

3. A portable bottle capping mechanism comprising in combination, a support, a frame mounted for vertical adjustable reciprocation thereon, motor means carried by the frame, a drive shaft connected therewith and having a pinon gear thereon, a spur gear intermeshing with said pinion gear, a cam formed integrally with and extending outwardly from said gear, a rotatable spindle vertically reciprocable in a portion of said frame, a pair of arms pivotally connected to said frame, each of said arms having mounted thereon roller means, said roller means arranged diametrically in opposed engaging disposition with said cam and lying generally on a vertical axis extending through both of said rollers and the cam, the topmost arm having a pivotal and rotatable connection with said spindle, driving means between said shaft and said spindle to rotate said spindle, tensioning means between said pair of arms, whereby operation of said motor means will rotate said cam to continuously reciprocate said spindle, the downward thrust imparted to said spindle not exceeding the biasing force exerted by said tensioning means and an adjustable torque clutch on the lower portion of the spindle, said clutch comprising a clutch housing having a cap engaging portion carried by the spindle, said housing constructed to permit rotation of the spindle relative thereto, a cone-like friction member fastened to the spindle and surrounded by the housing, a bearing ring surrounding the cone-like friction member and engageable therewith, a cap threadedly mounted on the housing, a resilient element between the cap and the bearing ring and locking means to lock said cap in adjusted position on the housing, whereby the twisting force between the cone-like friction member and the bearing ring may be selectively varied by adjusting the cap against the bias of the resilient element.

4. In a portable bottle capping machine, a frame, a rotatable spindle adapted to drivingly engage the cap of a container placed in engageable position therewith, said spindle mounted for vertical reciprocation in said frame, a first lever arm having one end thereof pivotally and rotatably connected to said spindle and the other end thereof pivotally connected to the frame, and means to oscillate said lever arm continuously to cyclically reciprocate said spindle, said means including a second lever arm pivoted at one end to said frame below said first lever arm, a resilient connection between the other end of said second lever arm and a medial portion of said first lever arm, and a rotatable cam between said lever arms operatively engaging said medial portion of said first lever arm and said other end of said second lever arm to impart a downward thrust to the spindle not exceeding the bias of said resilient connection, and means to continuously rotate said spindle.

5. In a portable bottle capping machine, a frame, a spindle reciprocable therein and adapted to drivingly engage the cap of a container positioned relative to the spindle, means to rotate said spindle, and a reciprocating mechanism to continuously reciprocate said spindle through a capping cycle, said mechanism comprising a lever arm having one end pivotally connected to said frame and the other end pivotally and rotatably connected to the spindle, a spring attached to the lever arm intermediate its ends, a driver member movably mounted on said frame below said lever arm and arranged to move in a generally reciprocatory path, and motor means arranged to pivotally move said lever arm upwardly and to move said driver member downwardly, the other end of said spring being attached to said driver member to pivotally move said lever arm downwardly and to move said driver member upwardly, the downward thrust imparted to said spindle being limited by the biasing force of said spring.

6. In a portable bottle capping machine as defined in claim 4, a stanchion having a hollow bore, means connecting said frame for adjustable movement on said stanchion, a counter-weight conforming in shape to the configuration of said bore and reciprocably received therein, a pulley wheel at the top of said stanchion, and a flexible connector connected to said frame and to said counter-weight and being trained over said pulley wheel, said counter-weight being vertically reciprocable in said hollow bore of said stanchion, whereby said frame may be vertically adjusted for different capping heights.

7. A bottle capping mechanism as defined in claim 1, said capping shell comprising a cup-shaped member formed to provide a recess bounded by cap-engaging resilient walls, an adjustable torque clutch comprising a clutch housing carried by said spindle, said housing constructed to permit rotation of the spindle relative thereto, a cone-like friction member fastened to the spindle and surrounded by said housing, a bearing ring surrounding the cone and having a complementary cone-shaped bearing surface engageable therewith, a cap member threadably mounted on the housing for axial movement relative to said friction member and said bearing ring, a resilient element between the cap and one end of said bearing ring, and locking means to lock said cap in adjusted position on said housing, whereby the twisting force between the cone-like friction member and the cone-shaped bearing surface of the bearing ring may be selectively varied by adjusting the cap axially against the bias of the resilient element.

References Cited in the file of this patent
UNITED STATES PATENTS

| Number | Name | Date |
| --- | --- | --- |
| 366,167 | Howell | July 5, 1887 |
| 1,022,591 | Perry | Apr. 9, 1912 |
| 1,673,091 | Risser | June 12, 1928 |
| 2,034,878 | Podel | Mar. 24, 1936 |
| 2,076,631 | Gantzer | Apr. 13, 1937 |
| 2,267,409 | Massini | Dec. 23, 1941 |
| 2,426,036 | Lynam | Aug. 10, 1947 |
| 2,558,679 | Gressel et al. | June 26, 1951 |
| 2,569,144 | Benson | Sept. 25, 1951 |

FOREIGN PATENTS

| Number | Country | Date |
| --- | --- | --- |
| 462,121 | Great Britain | Mar. 2, 1937 |